United States Patent [19]

Holmes

[11] 4,424,985

[45] Jan. 10, 1984

[54] OUTRIGGER SUPPORT ARRANGEMENT

[75] Inventor: Terry M. Holmes, Schofield, Wis.

[73] Assignee: J. I. Case Company, Racine, Wis.

[21] Appl. No.: 300,182

[22] Filed: Sep. 8, 1981

[51] Int. Cl.³ .............................................. B60S 9/12

[52] U.S. Cl. .................................. 280/766.1; 254/423

[58] Field of Search ........................... 52/632; 212/189; 248/352, 354 H, 354 S, 647; 254/86 H, 45; 280/766, 765, 763, 766.1, 765.1, 763.1, 764.1; 254/423

[56] References Cited

U.S. PATENT DOCUMENTS

| | | | |
|---|---|---|---|
| 3,716,252 | 2/1973 | Johnson | 280/766 |
| 3,754,777 | 8/1973 | Riggs et al. | 280/766 |
| 3,871,685 | 3/1975 | Senelet | 280/766 |
| 4,067,595 | 1/1978 | Vigerie | 280/766 |

FOREIGN PATENT DOCUMENTS

| | | | |
|---|---|---|---|
| 53282 | 1/1967 | Fed. Rep. of Germany | 212/189 |

*Primary Examiner*—David M. Mitchell

*Attorney, Agent, or Firm*—Dressler, Goldsmith, Shore, Sutker & Milnamow, Ltd.

[57] ABSTRACT

An improved outrigger support arrangement for a crane or like piece of equipment is disclosed for stabilization of the crane during work operations. The support arrangement includes an outrigger having a horizontally disposed beam portion and an extensible leg portion fixed thereto extending downwardly and angularly outwardly thereof. Upper and lower beam supports are provided on the wheeled frame of the crane for reactively engaging the outrigger when it is in an extended position. A fluid extensible cylinder and piston is provided for moving the outrigger from the extended position to a stowed position wherein it is substantially completely nested within a cavity defined by the frame of the crane.

3 Claims, 4 Drawing Figures

OUTRIGGER SUPPORT ARRANGEMENT

TECHNICAL FIELD OF THE INVENTION

This invention relates generally to stabilization outriggers for wheeled equipment frames, and more particularly to an improved outrigger support arrangement.

BACKGROUND OF THE INVENTION

In order to provide the necessary stability for cranes and similar equipment during work operations, the wheeled frame of the crane is typically provided with stabilizing outriggers. Outriggers are usually provided on laterally opposite sides of the equipment frame, with a pair of outriggers typically provided at each end of the frame. Each outrigger is adapted to engage the ground outwardly of the frame so that the stance of the crane is significantly wider during work operations. In this way, a significantly greater degree of stability for the frame is afforded than when the frame is being supported by its wheels.

Because the widest possible stance of the outriggers provides the best stability, it is desirable that the outriggers be extensible to positions outwardly of the equipment frame as much as possible. On the other hand, however, it is further desirable for the overall width of the crane to be as narrow as possible when the outriggers are not extended for enhancing the ease of maneuverability and transport of the crane, and for compliance with regulations prescribing certain maximum widths for transport purposes.

To this end, various arrangements are known in the art for articulation of the outriggers between stowed and extended positions. Some of these arrangements, such as shown in U.S. Pat. No. 3,426,918, to Keinonen, include a laterally shiftable outrigger including a pivotal leg portion, while others, such as shown in U.S. Pat. No. 3,337,063, to Testore, include linkage arrangements for movement of the outriggers inwardly and outwardly of the equipment frame. While outrigger support arrangements of these types are effective in providing the desired stance for the crane during work operations while minimizing its width when the outriggers are not in use, their operating mechanisms have tended to be somewhat complicated. Naturally, the complexity of these arrangements results in added fabrication and maintenance expense. Thus, an outrigger support arrangement of simplified construction which would still provide the necessary stabilization for a crane or similar piece of equipment, while being retractable to a stowed position so as to minimize the width of the piece of equipment between work operations, would be particularly suitable for use with equipment requiring stabilization during its use.

SUMMARY OF THE INVENTION

In accordance with the present invention, an outrigger support arrangement is disclosed having a simplified construction which provides the desired features during use and stowing of the outriggers. The support arrangement is suitable for any wheeled equipment frame which requires stabilization, such as the frame of a crane or other piece of equipment having an articulated boom.

The outrigger support arrangement includes an outrigger having an outrigger leg including an extensible foot portion engageable with the ground. The outrigger further includes a generally horizontally disposed outrigger beam fixed to the leg intermediate the ends thereof. The outrigger beam extends transversely of the equipment frame, with the outrigger leg preferably extending downwardly and angularly outwardly of the beam.

An outrigger cavity is defined by a pair of generally vertical, longitudinally spaced walls of the equipment frame, the outrigger beam extending within the outrigger cavity. Means are provided, such as a fluid extensible cylinder and piston, for moving the outrigger between a stowed position wherein the outrigger is substantially nested within the outrigger cavity, and an extended position wherein the outrigger leg is spaced laterally outwardly of the frame for engagement of the foot portion with the ground.

Because the outriggers of the crane are frequently used to support the entire weight of the crane (plus any load it is carrying), an effective arrangement must be provided for transferring reactive loads between the equipment frame and the outrigger. To this end, the support arrangement includes upper beam support means comprising a pair of horizontally disposed, laterally extending upper beam supports respectively fixed to the walls of the frame defining the outrigger cavity. The beam supports extend inwardly of the lateral edge portion of the frame, and the outrigger leg extends between the beam supports when the outrigger is in the stowed position. In this way, the outrigger beam is engageable with the upper beam supports such that when the outrigger is in the extended position the outrigger beam respectively engages the upper beam supports outwardly of a plane defined by an outwardly facing surface of the outrigger leg when the outrigger is in the stowed position.

The support arrangement further includes a pair of lower beam supports respectively fixed to the walls defining the outrigger cavity which the outrigger beam is also adapted to respectively engage.

While the above-described outrigger support arrangement is relatively simple in construction, it offers several advantages over arrangements heretofore known. By fixing the outrigger beam to the outrigger leg, the relatively complex pivotal interconnection of these two components provided in some arrangements is eliminated. Additionally, the angular disposition of the outrigger leg with respect to the beam enables the outrigger to provide the widest possible stance for the crane. At the same time, movement of the outrigger inwardly of the frame to the stowed position wherein the outrigger leg extends between the upper beam supports minimizes the overall width of the crane when the outriggers are retracted, for ease of maneuverability.

DESCRIPTION OF THE PREFERRED EMBODIMENT

Figure 1:
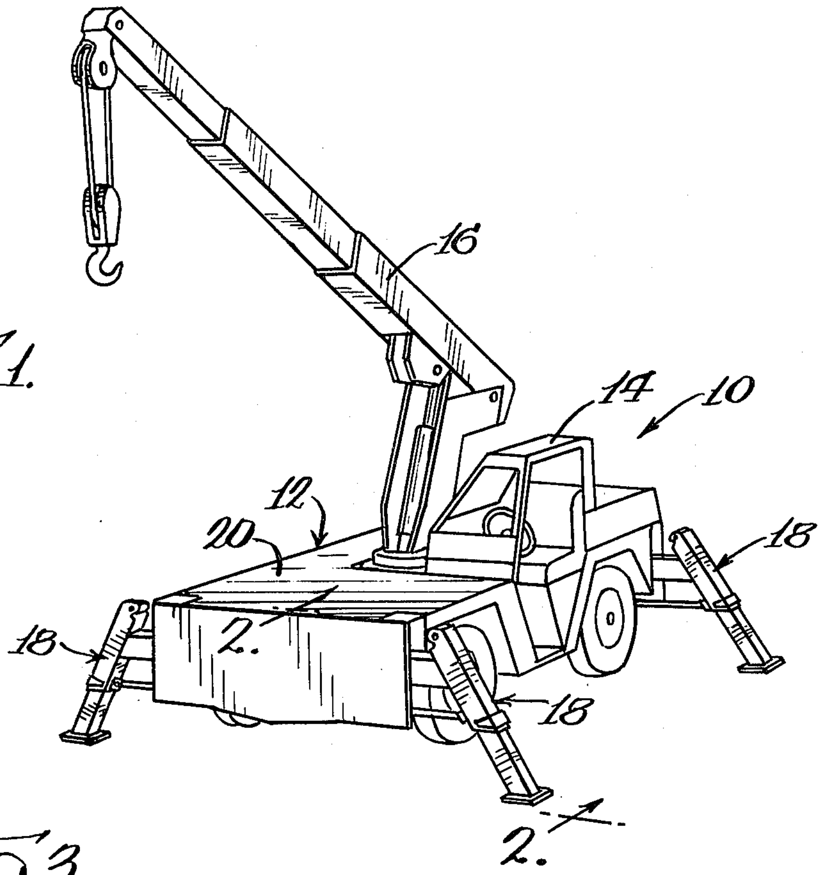
FIG. 1 is a perspective view of a cargo crane having outrigger support arrangements in accordance with the present invention.

While the present invention is susceptible to embodiment in different forms, there is shown in the drawings and will hereinafter be described a presently preferred embodiment with the understanding that the present disclosure is to be considered as an exemplification of the invention. It is not intended to limit the invention to the specific embodiment illustrated.

With reference now to FIG. 1, therein as illustrated a decked crane 10. Crane 10 includes a wheeled crane 12 having an operator control cab 14. Frame 12 supports an articulated, extensible boom crane 16 which is operated from the control cab. A pair of outriggers 18 are provided at each end of frame 12, outriggers 18 being extendable of frame 12 so that the entire crane 10 may be provided with a wider stance than it has when supported by the wheels of its frame. Cranes of the type illustrated in FIG. 1 have proven to be particularly versatile in that frame 12 includes a cargo deck 20 for support of materials and equipment on the crane during its use.

Figure 3:
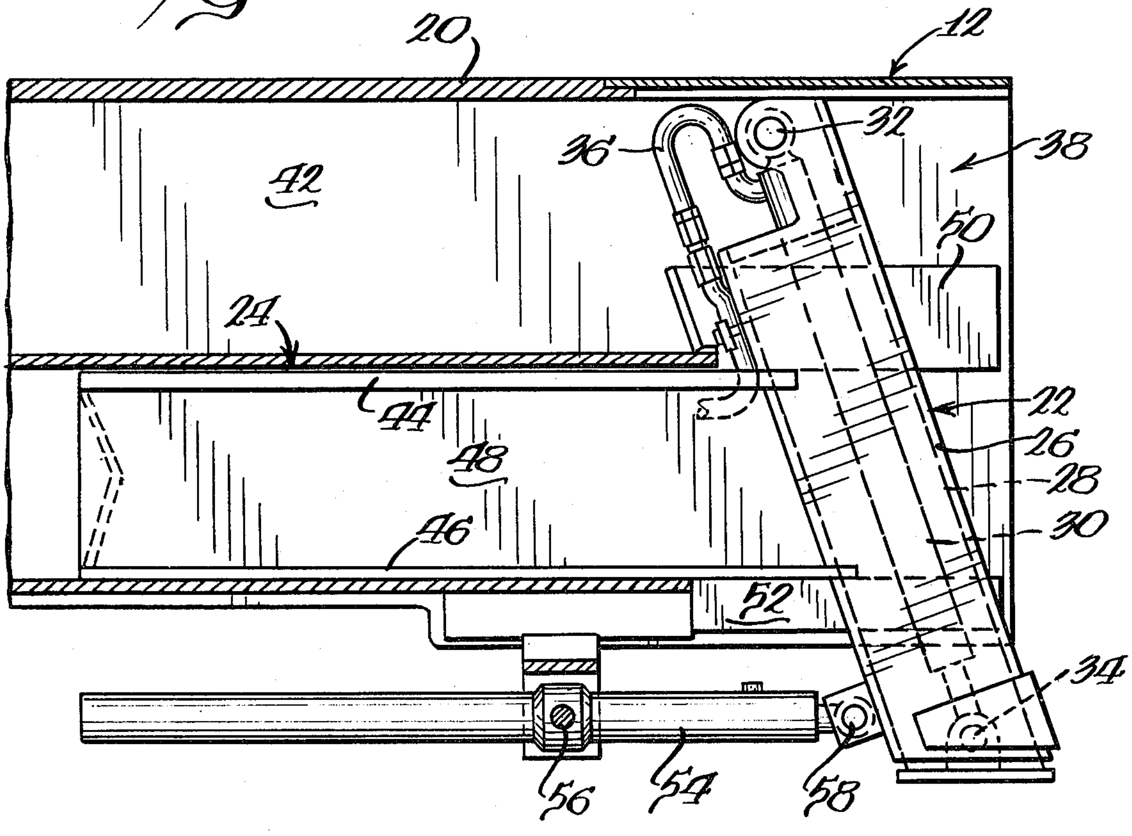
FIG. 3 is a view taken generally along line 2—2 of FIG. 1 illustrating an outrigger in the stowed position.
Figure 2:
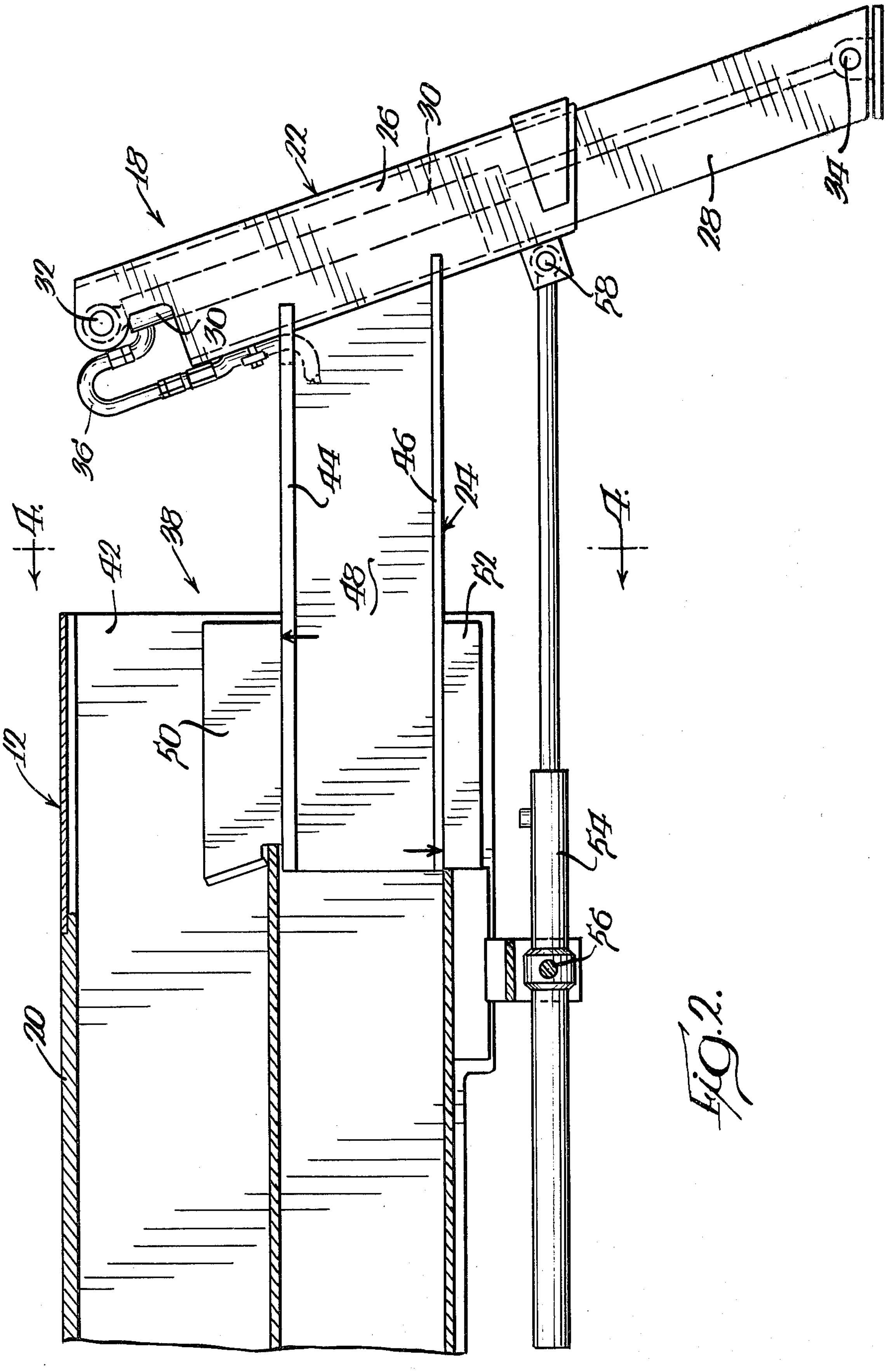
FIG. 2 is a view taken generally along lines 2—2 of FIG. 1 illustrating an outrigger in an extended position.
Figure 4:
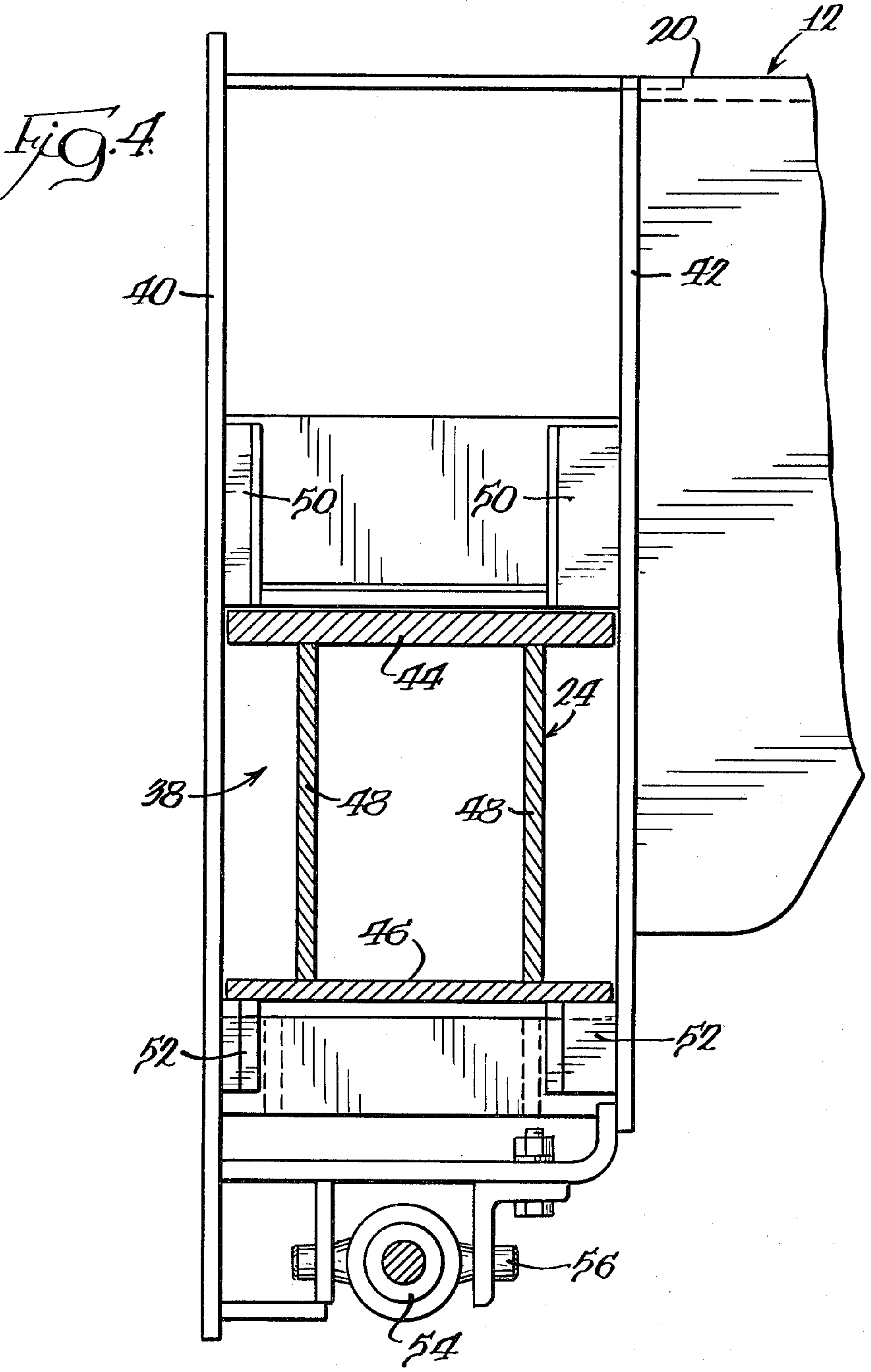
FIG. 4 is a view taken generally along line 4—4 of FIG. 2.

With reference now to FIGS. 2–4, the outrigger support arrangement of the present invention is illustrated. As shown, each of outriggers 18 includes a telescopic outrigger leg 22 fixed to one end of a box-like outrigger beam 24. Beam 24 is preferably connected with leg 22 intermediate the ends thereof, with the leg extending downwardly and angularly outwardly of the beam so that the leg may engage the ground at a point spaced from frame 12 as much as possible when outrigger 18 is fully extended.

So that outrigger leg 22 may be brought into engagement with the ground for support of crane 10, the outrigger leg includes a tubular outer leg portion 26 within which a tubular extensible inner leg portion 28 is telescopically disposed. A fluid extensible hydraulic cylinder and piston 30 is disposed within the outer and inner leg portions and is respectively connected thereto at its ends at connections 32 and 34. Hydraulic fluid lines 36 selectively supply high pressure hydraulic fluid to the cylinder and piston so that inner leg portion 28 may be extended with respect to outer leg portion 26 with sufficient force to permit outriggers 18 to support the entire crane 10. FIG. 2 clearly illustrates outrigger leg 22 in the fully extended position.

As noted, it is desirable that each outrigger 18 may be retracted with respect to frame 12 so that the outriggers are stowed in an out-of-the-way position. To this end, frame 12 defines an outrigger cavity 38 for each of outriggers 18. Cavity 38 is defined by a pair of vertically extending longitudinally spaced frame walls 40 and 42. Outrigger beam 24 extends horizontally into cavity 38.

As best shown in FIG. 4, outrigger beam 24 preferably is of a box-like configuration, and includes spaced upper and lower beam plates 44 and 46, and spaced side beam plates 48 extending between the upper and lower plates.

So that loads are effectively transferred between wheeled frame 12 and outrigger 18, upper beam plate 44 of outrigger beam 24 is adapted to reactively engage a pair of upper beam supports 50 respectively fixed to framed walls 40 and 42. Each of upper beam supports 50 extend inwardly from the lateral edge of frame walls 40 and 42. Significantly, beam supports 50 are provided such that outrigger leg 22 extends therebetween when the outrigger is in a stowed position, as will be described.

Further support of outrigger 18 is provided by a pair of lower beam supports 52 respectively fixed to frame walls 40 and 42. Lower beam supports 52 are adapted to reactively engage lower beam plate 46 of outrigger beam 24, and slidably support the outrigger when it is moved between the extended position illustrated in FIG. 2 and the retracted or stowed position illustrated in FIG. 3. Movement of outrigger 18 between the stowed and extended positions is provided by a fluid extensible hydraulic cylinder and piston 54 respectively connected at its ends to frame 12 and outrigger leg 22 at connections 56 and 58.

The relatively simplified construction of the outrigger support arrangement of the present invention provides straightforward operation of the outriggers. After the crane or other piece of equipment has been positioned where desired, pressurized hydraulic fluid is supplied to cylinder and piston 54 for extension thereof. This moves outrigger 18 outwardly of frame 12 to the position illustrated in FIG. 2. After the outrigger is fully extended from frame 12, pressurized hydraulic fluid is supplied to cylinder and piston 30 so that inner leg portion 28 is moved downwardly of outer leg portion 26 until the foot of the inner leg portion engages the ground. Continued extension of cylinder and piston 30 causes outrigger leg 22 to further extend so that the weight of crane 10 is shifted from the wheels of frame 12 to outriggers 18. Notably, the angular disposition of outrigger leg 22 with respect to outrigger beam 24 provides crane 10 with the widest possible stance. As shown by the arrows in FIG. 2, outrigger beam 24 respectively engages upper beam supports 50 near the lateral edge of frame 12, and lower frame support 52 at the bottom inner edge portion of the beam. When crane 10 is supported by all four outriggers 18, the stability of the crane is significantly increased when the crane is supported only by the wheels of its frame.

When work operations requiring stabilization of crane 10 are completed, each of outriggers 18 is moved to its stowed position by essentially reversing the above procedure. Inner leg portion 28 of outrigger leg 22 is retracted within outer leg portion 26, whereby crane 10 is again supported by the wheels of its frame. Each outrigger is then moved laterally inwardly of frame 12 by actuation and contraction of cylinder and piston 54 until outrigger 18 is again stowed within outrigger cavity 38, as shown in FIG. 3. Notably, the overall arrangement of the outrigger support of the present invention provides that outrigger 18 is substantially completely nested within cavity 38, thus enhancing the maneuverability of crane 10 when the outriggers are retracted. Significantly, the arrangement of the present invention provides that each outrigger is moved to a retracted position wherein a plane defined by the outwardly facing surface of outrigger leg 22 is disposed inwardly of the point of reactive engagement between outrigger beam 24 and upper beam supports 50 when the outrigger is extended and supporting crane 10. In this way, a relatively greater outrigger spread or stance is achievable than with other designs, while still providing a minimal retracted width.

Thus, an improved outrigger support arrangement is disclosed having a simplified construction which provides the desired stability for the crane of which it is a part while minimizing the overall retracted width of the arrangement.

From the foregoing, it will be observed that numerous variations and modifications may be effected without departing from the true spirit and scope of the novel concept of the present invention. It will be understood that no limitation with respect to the specific embodiment illustrated herein is intended or should be inferred.

It is, of course, intended to cover by the appended claims all such modification as fall within the scope of the claims.

What is claimed is:

1. An outrigger support arrangement for a wheeled equipment frame, comprising:

an outrigger having an outrigger leg including an extensible leg portion engageable with the ground, and generally horizontally disposed outrigger beam fixed to said leg, said outrigger beam extending transversely of said equipment frame and said outrigger leg includes an outer leg portion fixed to said outrigger beam within which said extensible leg portion is telescopically disposed, and a fluid extensible leg cylinder and piston respectively connected at its ends to said outer leg portions and said extensible leg portion, which leg extends generally downwardly and angularly outwardly of said beam, an outrigger cavity defined by a pair of generally vertical, longitudinally spaced walls of said frame within which said outrigger beam extends, means including a fluid extensible cylinder and piston for moving said outrigger between a stowed position wherein said outrigger is substantially nested within said cavity and an extended position wherein said leg is spaced laterally outwardly of said frame for engagement of said extensible leg portion with the ground, upper beam support means comprising a pair of horizontally disposed, laterally extending upper beam supports respectively fixed to said walls extending from the lateral edge portion of said frame inwardly thereof, said outrigger leg extending between said upper beam supports when said outrigger is in the stowed position, whereby when said outrigger is in said extended position said beam reactively engages said upper beam support means outwardly of a plane defined by an outwardly facing surface of said outrigger leg when said outrigger is in said stowed position.

2. An outrigger support arrangement in accordance with claim 1, wherein said outrigger beam has a box-like configuration including spaced upper and lower beam plates and spaced side beam plates extending between said upper and lower plates.

3. An outrigger support arrangement in accordance with claim 1 and lower beam support means comprising a pair of horizontally disposed, laterally extending lower beam supports respectively fixed to said spaced frame walls extending from the lateral edge portion of said frame inwardly thereof, said outrigger beam reactively engaging said lower beam supports when said outrigger is in said extended position.

* * * * *